Sept. 14, 1926.  
J. E. HOFFER  
1,599,529  
WEIGHING SCALE OR THE LIKE  
Filed March 10, 1925
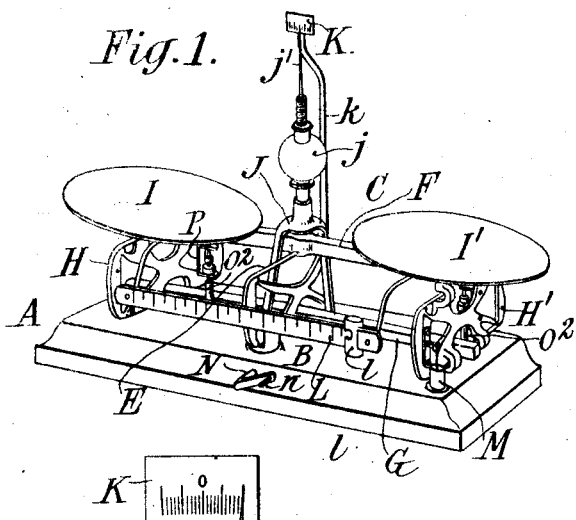
Fig.1.
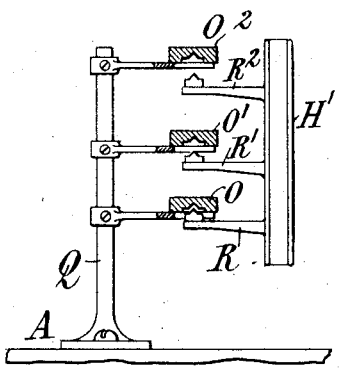
Fig.4.
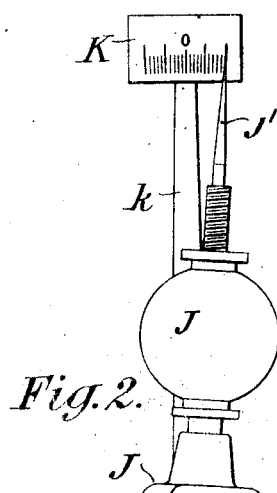
Fig.2.
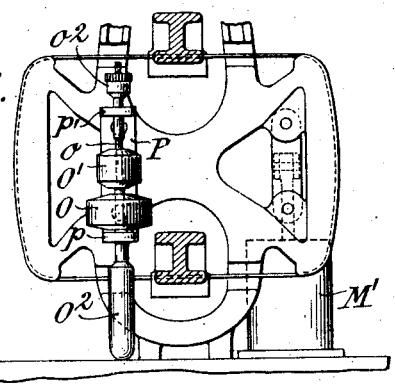
Fig.3.
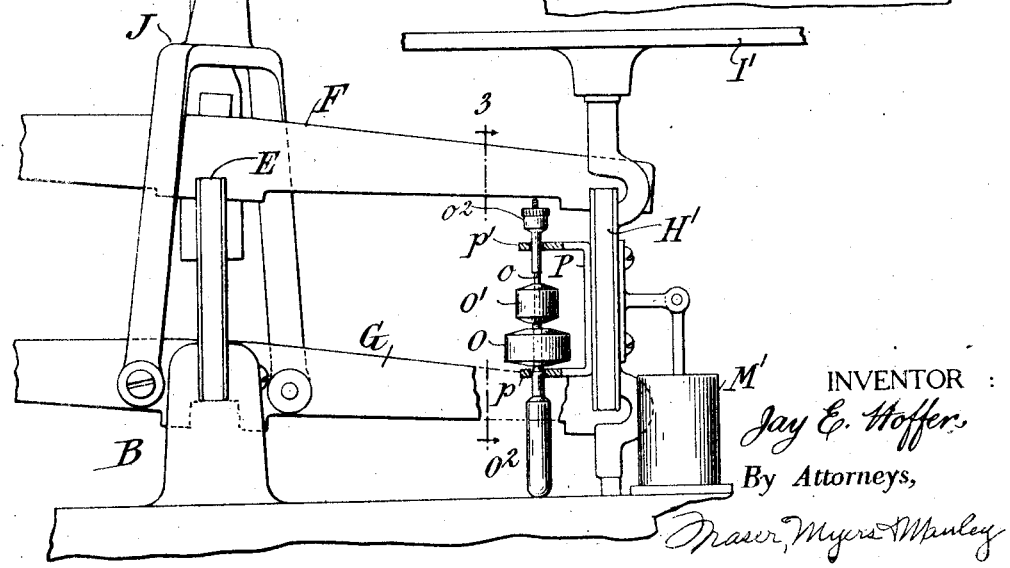
INVENTOR:  
Jay E. Hoffer.  
By Attorneys, Patented Sept. 14, 1926.

1,599,529

UNITED STATES PATENT OFFICE.

JAY E. HOFFER, OF NEW YORK, N. Y., ASSIGNOR TO THE TORSION BALANCE COMPANY, OF NEW YORK, N. Y., A CORPORATION OF NEW YORK.

WEIGHING SCALE OR THE LIKE.

Application filed March 10, 1925. Serial No. 14,362.

The present invention relates to weighing scales or balances, and aims to provide certain improvements therein.

The sensitiveness of a balance for any given load remaining the same, the rapidity of weighing depends upon the skill of the operator. This is especially true where rapidity of weighing without overweight is to be carried on, for example, where it is undesirable or impracticable to remove from the balance any of the material being weighed, such as light powders and liquids. In weighing out quantities of such materials, it is therefore of great advantage if some sort of warning can be given of the approaching of the desired weight.

According to the present invention, I provide a scale, or an attachment therefor, which will give one or more definite warnings of the approaching of the desired weight as material is being added to the balance, and thereby expedite the weighing operation. This I accomplish by providing one or more movable masses which are adapted to be progressively taken up by the movable beam of the balance, preferably at or near the end of the beam, as it moves toward its position of equipoise during the weighing operation. And as each mass is successively taken up by the beam, further movement of the beam toward equipoise will be temporarily arrested, and these relative positions of the beam will be shown by the indicating means of the balance. These masses are released as the end of the beam which supports them again moves to a position below the horizontal. The invention also contemplates other features of novelty, which will be hereinafter more fully described.

In the accompanying drawings wherein I have shown certain preferred embodiments in my invention, Figure 1 is a perspective view of a weighing scale or balance embodying my invention. Fig. 2 is an enlarged elevation of the balance, parts being broken away to more clearly show the present invention. Fig. 3 is a transverse section taken on the plane of the line 3—3 of Fig. 2. Fig. 4 is a detail of a modification of the invention.

Referring first to Figs. 1 to 3 of the drawings wherein my invention, by way of illustration, is shown as applied to a torsion balance, let A indicate the base of the balance and B, B a pair of feet or uprights, which rigidly support the middle truss of the balance C, said parts constituting the balance stand. Surrounding this truss is a thin steel torsion band E, which supports the movable beam of the balance, which beam consists of an upper beam F, a lower beam G and the end trusses H and H'. The balance beam also supports at its ends the scale pans or plates I and I' and, at its middle, a poise J, which straddles the upper and lower beams, said poise being provided with an adjustable poise ball $j$ and an indicator or pointer $j'$, which is adapted to laterally move in front of an index K, which is supported by a bracket $k$ affixed to the middle truss E. The balance beam is provided with a graduated beam L, upon which is mounted a slide weight $l$, and at one end of said beam with a dash pot M of any approved construction, for the purpose of damping the oscillation of the beam. The balance is also provided with beam arrests (not shown) operable by rod N through the crank-handle $n$. The balance as thus far described, with or without the addition of further refinements, is the well known torsion balance, extensively used in the arts.

According to the present invention, a balance as thus described or any other form of balance is provided with means for definitely warning of the approaching of the desired weight during a weighing operation by the provision of means for temporarily arresting the movement of the beam after it begins to move toward equipoise, upon the addition of material or weights to one of the balance pans to counterbalance the weights or material on the other balance pan. The means which I have provided for accomplishing this, consist of one or more masses $O$, $O'$ and $O^2$, which are adapted to be successively taken up and supported by the beam through the medium of a bracket P, or other suitable member, which is preferably carried by an end truss of the movable beam. As best shown in Figs. 2 and 3, the masses $O$, and $O'$ are slidably supported upon a spindle $o$ of various diameters, said spindle $o$ being carried by the mass $O^2$, which is adapted to rest upon the base of the balance, and when so resting, the masses $O$, $O'$ and $O^2$ are not supported by the balance beam but are steadied in their upright position by the bracket arms $p, p'$, which straddle the spindle which supports the masses. The masses O, O' and $O^2$ are so relatively spaced on the spindle and the masses O and O' movable thereon and with respect to the arms $p, p'$, that as the end of the balance beam to which said bracket P is attached moves from its position below the horizontal to its horizontal position, or position of equipoise, the mass O will first be taken up by the arm $p$, and as it moves on the spindle $o$ it engages and takes up the mass O' and as the upward movement of the beam continues the mass $O^2$ will be taken up by engagement of the arm $p'$ with the head $o^2$ at the top of the mass $O^2$. This last mass is preferably taken up shortly before the balance comes to equipoise. Since the pointer $j'$ is carried by the balance beam, said pointer will indicate the relative position of the beam on the index K; hence as the beam is successively arrested in its upward movement as the masses are picked up, the pointer $j'$ will give definite indications or warnings of the approaching of the beam to equipoise. As the end of the beam again moves to a position below the horizontal it will be apparent that the masses $O^2$, O' and O are successively released from the beam.

In the balance herein shown, each end of the beam is provided with the means for progressively taking up masses as the respective end of the beam moves from its position below the horizontal toward its horizontal position, and for releasing said masses as the end of the beam again moves below the horizontal. It will be understood, however, that in lieu of the movable mass or masses at one end only of the beam an equivalent mass may be built directly into the scale at said end of the beam. The taking up and releasing of these masses will also serve to dampen the oscillation of the beam, and where dash pots such as M and M' are employed for damping the beam oscillation, it will be apparent that the action of the beam in co-operation with the masses will enhance the efficiency of the damping operation.

In Fig. 4 I have shown the masses O, O' and $O^2$ as carried upon arms affixed to an independent support Q mounted on the base A, and the truss H' provided with lateral arms R, R' and $R^2$ so spaced apart and positioned with respect to said masses as to progressively take up the masses O, O' and $O^2$ in succession as the end of the beam moves from its position below the horizontal to its position of equipoise.

While I have shown and described certain preferred embodiments of my invention, it will be understood that I do not wish to be limited to the specific modifications or structural details disclosed, since these may be changed without departing from the spirit of the invention.

What I claim is:—

1. A weighing scale or balance comprising a stand, a movable beam, a plurality of movable masses, and means carried by the beam adapted to successively take up the masses after the beam begins to move toward equipoise during a weighing operation, to definitely warn of the approaching of the beam to equipoise, the last mass adapted to be taken up shortly before the beam comes to equipoise.

2. A weighing scale or balance, comprising a stand, a movable beam, masses supported by each arm of the beam when the beam is substantially in equipoise and free of weights of material to be weighed, at least one of said masses being movable with respect to the beam, and the movable mass being adapted to be released from the beam as the arm which supports it moves to a position below the horizontal.

3. A weighing scale or balance, comprising a stand, a movable beam, indicating means comprising a pointer and an index adapted to cooperate with the pointer for indicating when the beam is in equipoise, and means adapted to temporarily arrest the movement of the beam at a plurality of definite points before the beam comes to equipoise as it moves toward its position of equipoise upon the addition of material or the like to one arm of the beam during a weighing operation.

4. A weighing scale or balance comprising a stand, a movable beam having arms of equal length, and means to dampen the oscillation of the beam, comprising a plurality of movable masses cooperating with each arm of the beam and adapted to be successively taken up or released by the beam as it moves from a position of unequilibrium to its position of equipoise and to successively release or take up said masses as the beam moves from its position of equipoise to a position of unequilibrium.

In witness whereof, I have hereunto signed my name.

JAY E. HOFFER.